US012810700B2

(12) United States Patent
Ujita et al.

(10) Patent No.: US 12,810,700 B2
(45) Date of Patent: *Nov. 24, 2026

(54) AUTOMATED TELLER MACHINE (ATM) ANOMALY DETECTION AND RESOLUTION

(71) Applicant: Bank of America Corporation, Charlotte, NC (US)

(72) Inventors: Daryl K. Ujita, Alhambra, CA (US); Joshua A. Beaudry, Jersey City, NJ (US); Amadou Bocoum, Mansfield, TX (US); Marco Mascioli, Charlotte, NC (US); Katrina L. Gibson-Walker, Ellenwood, GA (US); Jeremy J. Acker, Clarence Center, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/318,289

(22) Filed: Sep. 3, 2025

(65) Prior Publication Data

US 2026/0004644 A1 Jan. 1, 2026

Related U.S. Application Data

(63) Continuation of application No. 18/671,272, filed on May 22, 2024, now Pat. No. 12,482,333.

(51) Int. Cl.
*G07F 19/00* (2006.01)

(52) U.S. Cl.
CPC .................................. *G07F 19/209* (2013.01)

(58) Field of Classification Search
CPC ...... G07F 19/20; G07F 19/206; G07F 19/207; G07F 19/209; G07F 19/211
See application file for complete search history.

(56) References Cited

U.S. PATENT DOCUMENTS 7,503,481 B2 3/2009 Ramachandran et al.
7,677,442 B2 3/2010 VanKirk et al.
8,091,784 B1 1/2012 Ma et al.
8,430,305 B2 4/2013 Jenkins et al.
9,021,583 B2 4/2015 Wittenstein et al.
9,576,278 B2 2/2017 Gromley et al.
10,025,659 B2 7/2018 Shinde et al.
10,574,512 B1 2/2020 Mermoud et al.
10,581,901 B2 3/2020 Dasgupta et al.
10,659,333 B2 5/2020 Sartran et al.
10,764,310 B2 9/2020 Vasseur et al.
11,169,506 B2 11/2021 Arashanipalai et al.
11,171,975 B2 11/2021 Vasseur et al.
11,570,209 B2 1/2023 Crabtree et al.
(Continued)

*Primary Examiner* — Laura A Gudorf
(74) *Attorney, Agent, or Firm* — Banner & Witcoff, Ltd.

(57) ABSTRACT

Arrangements for detecting and resolving automated teller machine (ATM) anomalies are provided. A computing platform may receive information related to one or more automated teller machines (ATMs) that may include one or more anomalies. The computing platform may preprocess the information to remove one or more false positives from the information. The computing platform may apply anomaly detection logic to the preprocessed information to identify one or more anomalies. The computing platform may output one or more anomaly codes that correspond to the identified one or more anomalies. The computing platform may identify and subsequently execute one or more actions to resolve the one or more anomalies.

20 Claims, 12 Drawing Sheets

(56) References Cited

U.S. PATENT DOCUMENTS

| | | | |
|---|---|---|---|
| 2006/0131381 | A1 | 6/2006 | Timmis et al. |
| 2020/0167786 | A1 | 5/2020 | Kursun |
| 2020/0169483 | A1 | 5/2020 | Kursun |
| 2020/0389495 | A1 | 12/2020 | Crabtree et al. |
| 2020/0412767 | A1 | 12/2020 | Crabtree et al. |
| 2021/0327223 | A1 | 10/2021 | Kumar et al. |
| 2022/0043838 | A1 | 2/2022 | Zavesky et al. |
| 2022/0321591 | A1 | 10/2022 | Singh |
| 2022/0353166 | A1 | 11/2022 | Kolar et al. |

705

AUTOMATED TELLER MACHINE (ATM) ANOMALY DETECTION AND RESOLUTION

CROSS-REFERENCE TO RELATED APPLICATIONS

This application is a continuation of and claims priority to U.S. patent application Ser. No. 18/671,272, filed on May 22, 2024, and entitled "Automated Teller Machine (ATM) Anomaly Detection and Resolution," which is incorporated herein by reference in its entirety.

BACKGROUND

Aspects of the disclosure relate to detecting and resolving anomalies across a fleet of automated teller machines (ATMs) (and/or other self-service kiosks). In some instances, there may be one or more ATMs (e.g., an ATM fleet) within an enterprise system that may encounter anomalies associated with transactions at the one or more ATMs, which may be time consuming and resource intensive to resolve. Accordingly, it may be advantageous to improve the process of detecting and resolving such anomalies.

SUMMARY

Aspects of the disclosure provide effective, scalable, and convenient technical solutions that address and overcome the technical problems associated with detecting and resolving ATM anomalies. In accordance with one or more embodiments of the disclosure, a computing platform comprising at least one processor, a communication interface, and memory storing computer-readable instructions may receive information related to one or more automated teller machines (ATMs) that may indicate potentially anomalous activity at the one or more ATMs. The computing platform may preprocess the information to remove one or more false positives from the information. The computing platform may apply anomaly detection logic to the preprocessed information, in which the anomaly detection logic may include one or more rules that may be used to identify one or more anomalies. The computing platform may apply anomaly detection logic to the preprocessed information, in which the anomaly detection logic may include one or more rules that may be used to identify one or more anomalies. The computing platform may output, based on applying the anomaly detection logic, one or more anomaly codes, in which the one or more anomaly codes may correspond to the one or more anomalies. The computing platform may trend the one or more anomalies based on the one or more anomaly codes and using statistical analysis. The computing platform may identify one or more actions to resolve the one or more anomalies based on the trending. The computing platform may automatically execute the one or more actions by sending commands to the one or more ATMs affected by the one or more anomalies that may direct the one or more affected ATMs to execute the one or more actions.

In one or more examples, the computing platform may generate an anomaly report, in which the anomaly report may include the one or more anomalies, the trending, and the one or more actions. The computing platform may send, to an enterprise computing device, the anomaly report and one or more commands directing the enterprise computing device to display the anomaly report, which may cause the enterprise computing device to display the anomaly report.

In some instances, the computing platform may train, based on statistical anomaly information, an anomaly resolution model, in which training the anomaly resolution model may configure the anomaly resolution model to identify, based on the statistical anomaly information, the one or more actions to resolve the one or more anomalies, in which identifying the one or more actions to resolve the one or more anomalies may further be performed using the anomaly resolution model.

In one or more examples, the computing platform may update, using a dynamic feedback loop and based on the statistical anomaly information, the one or more actions to resolve the one or more anomalies, the anomaly resolution model. In some instances, the outputting the one or more anomaly codes may include outputting one or more ATM attribute.

In some instances, outputting the one or more ATM attributes may include outputting one or more of an ATM identifier, an ATM manufacturer, an ATM model, a state, a city, a market, a country, an address, a zip code, a latitude and longitude, or an ATM branch. In one or more examples, performing the trending further may include outputting a market rank for one or more subsets of ATMs within one or more markets.

In one or more examples, the market rank may be used to identify the one or more actions to resolve the one or more anomalies. In some instances, performing the trending may further include generating an ATM rank for the one or more ATMs. In one or more examples, the ATM rank may be used to identify the one or more actions to resolve the one or more anomalies. In some instances, the information related to the one or more ATMs may originate from a general ledger information source or a vendor claim source.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to detecting and resolving anomalies across a fleet of automated teller machines (ATMs) (and/or other self-service kiosks). In some instances, there may be one or more ATMs (e.g., an ATM fleet) within an enterprise system that may encounter anomalies associated with transactions at the one or more ATMs. Currently, the detection and resolution of ATM anomalies may be time consuming and resource intensive. Previously, enterprise systems might not have had the ability to detect and/or resolve ATM anomalies throughout the enterprise system.

Accordingly, it may be advantageous to improve the process of detecting and resolving ATM anomalies. In accordance with some aspects, a centralized system may receive information that may indicate the presence of one or more anomalies at one or more ATMs. The centralized system may prefilter the information to remove false positives that might not be indicative of anomalous activity. Accordingly, the system may apply anomaly detection logic to the information in order to identify anomalous activity at one or more of the ATMs. The system may trend the anomalous activity and/or identify actions to resolve the anomalous activity using statistic analysis. In some instances, an anomaly resolution model may be trained to identify the actions. The results performed by the system may also be visualized in order to further support the detection and resolution of the anomalous activity.

Figure 1A:
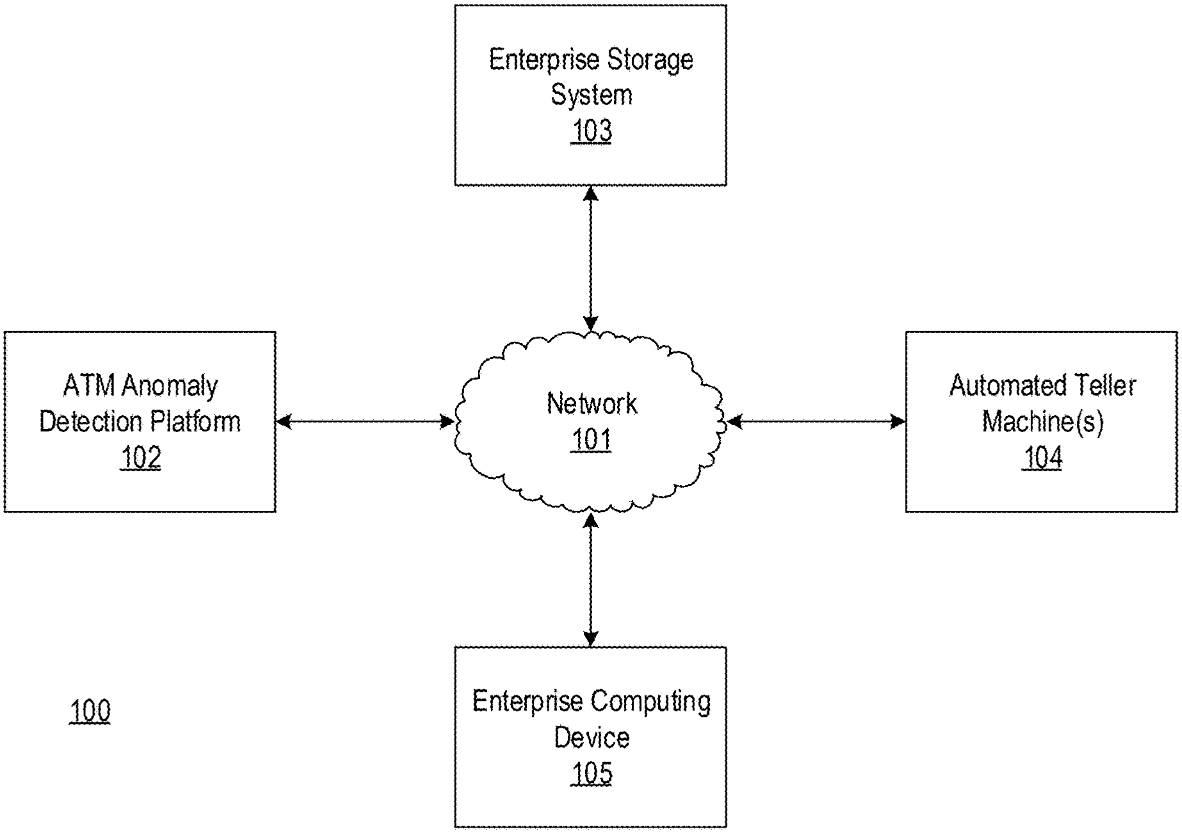
FIGS. 1A-1B depict an illustrative computing environment for detecting and resolving ATM anomalies in accordance with one or more aspects described herein.
Figure 1B:
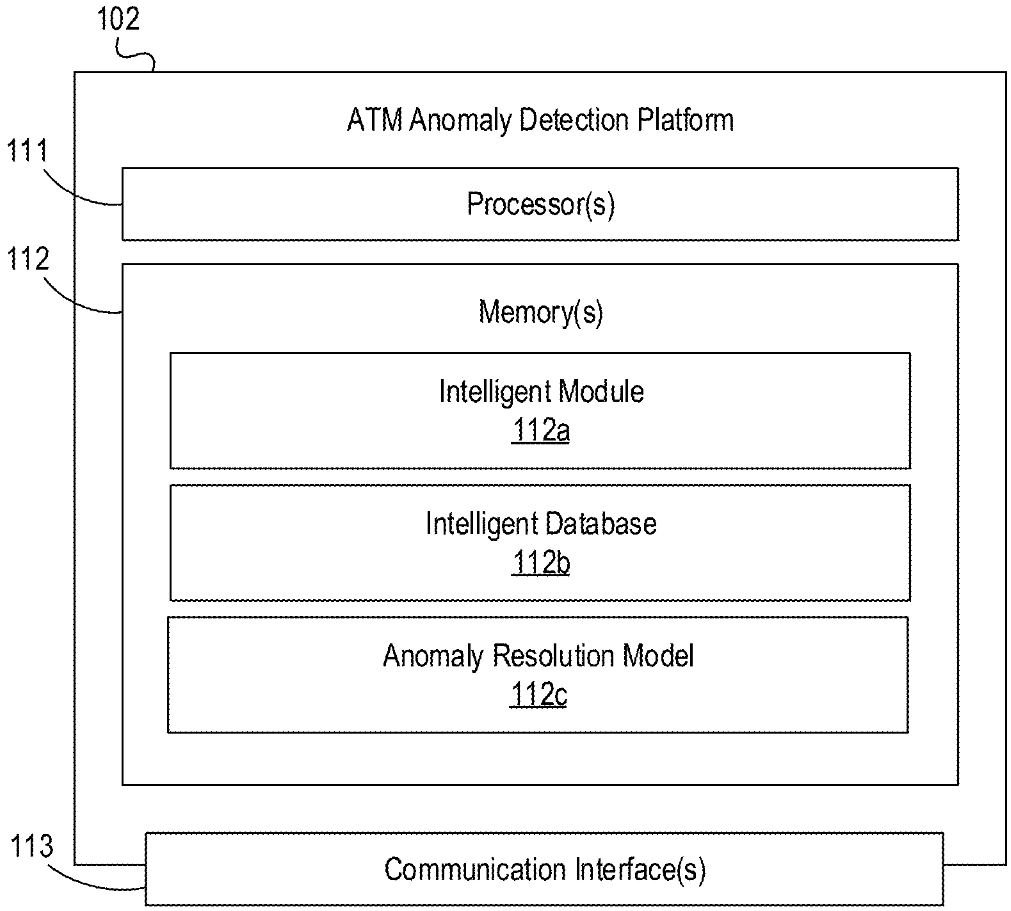

FIGS. 1A-1B depict an illustrative computing environment for detecting and resolving ATM anomalies in accordance with one or more aspects described herein. Referring to FIG. 1A, computing environment 100 may include one or more computer systems. For example, computing environment 100 may include ATM anomaly detection platform 102, enterprise storage system 103, automated teller machine(s) (ATMs) 104, and/or enterprise computing device 105.

As described further below, ATM anomaly detection platform 102 may be a computer system that includes one or more computing devices (e.g., servers, server blades, or the like) and/or other computer components (e.g., processors, memories, communication interfaces) that may be used to train, host, and/or otherwise refine an anomaly resolution model, which may be used to detect and/or resolve anomalies associated with ATMs 104.

Enterprise storage system 103 may be or include one or more computing devices (e.g., servers, server blades, or the like) and/or computer components (e.g., processors, memories, communication interfaces, and/or other components). In some instances, enterprise storage system 103 may include one or more data sources that may store information from ATMs 104 that may indicate the presence of one or more anomalies, as discussed in more detail below. In some instances, enterprise storage system 103 may be configured as a cloud storage system, in which enterprise storage system 103 may be a cloud computing model that stores data on the Internet through a cloud computing provider who manages and operates enterprise storage system 103 as a service. In some instances, enterprise storage system 103 may be local or non-cloud based storage, or may support cloud based storage.

ATMs 104 may be computing devices or systems configured to dispense funds, display account information, and/or otherwise facilitate transactions for a customer such as processing a recently deposited financial instrument. ATMs 104 may also generate and/or send information to enterprise storage system 103 and/or ATM anomaly detection platform 102. Although ATMs 104 are shown as a single system, this is for illustrative purposes only, and any number of ATMs may be included in the environment 100 without departing from the scope of the disclosure.

Enterprise computing device 105 may be and/or otherwise include a laptop computer, desktop computer, mobile device, tablet, smartphone, server, server blade, and/or other device that may be configured to receive and/or display an anomaly report (e.g., a report summarizing the detection and resolution of anomalies at one or more of ATMs 104) using one or more user graphical interfaces (e.g., FIGS. 7 and/or 8), on behalf of an enterprise organization, such as a financial institution.

Computing environment 100 also may include one or more networks, which may interconnect ATM anomaly detection platform 102, enterprise storage system 103, ATM(s) 104, and/or enterprise computing device 105. For example, computing environment 100 may include a network 101 (which may interconnect, e.g., ATM anomaly detection platform 102, enterprise storage system 103, ATM(s) 104, and/or enterprise computing device 105).

In one or more arrangements, ATM anomaly detection platform 102, enterprise storage system 103, ATM(s) 104, and/or enterprise computing device 105 may be any type of computing device capable of sending and/or receiving requests and processing the requests accordingly. For example, ATM anomaly detection platform 102, enterprise storage system 103, ATM(s) 104, enterprise computing device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all ATM anomaly detection platform 102, enterprise storage system 103, ATM(s) 104, and/or enterprise computing device 105 may, in some instances, be special-purpose computing devices configured to perform specific functions.

Referring to FIG. 1B, ATM anomaly detection platform 102 may include one or more processors (e.g., processor 111), memory 112, and a communication interface (e.g., communication interface 113)). A data bus may interconnect the processor 111, memory 112, and communication interface 113. Communication interface 113 may be a network interface configured to support communication between ATM anomaly detection platform 102 and one or more networks (e.g., network 101, or the like). Communication interface 113 may be communicatively coupled to the processor(s) 111. The memory may include one or more program modules having instructions that when executed by processor(s) 111 cause ATM anomaly detection platform 102 to perform one or more functions described herein and/or one or more databases that may store and/or otherwise maintain information which may be used by such program modules and/or processor(s) 111. In some instances, the one or more program modules and/or databases may be stored by and/or maintained in different memory units of ATM anomaly detection platform 102 and/or by different computing devices that may form and/or otherwise make up ATM anomaly detection platform 102. For example, the memory may have, host, store, and/or include intelligent module 112*a*, intelligent database 112*b*, and/or anomaly resolution model 112*c*.

Intelligent module 112*a* may have instructions that direct and/or cause ATM anomaly detection platform 102 to receive information from ATMs 104, detect one or more anomalies based on the information, identify and/or execute one or more actions to resolve the anomalies, and/or perform other functions, as discussed in greater detail below. Intelligent database 112*b* may have instructions and/or data used by intelligent module 112*a*, and/or ATM anomaly detection platform 102 to store information used by intelligent module 112*a* and/or ATM anomaly detection platform 102 in furtherance of detecting and resolving anomalies and/or performing other functions. Anomaly resolution model 112*c* may implement, refine, train, maintain, and/or otherwise host a statistical model, such as an anomaly resolution model, that may be used to resolve anomalies by identifying actions to resolve the anomalies, and/or other methods described herein.

Figure 2A:
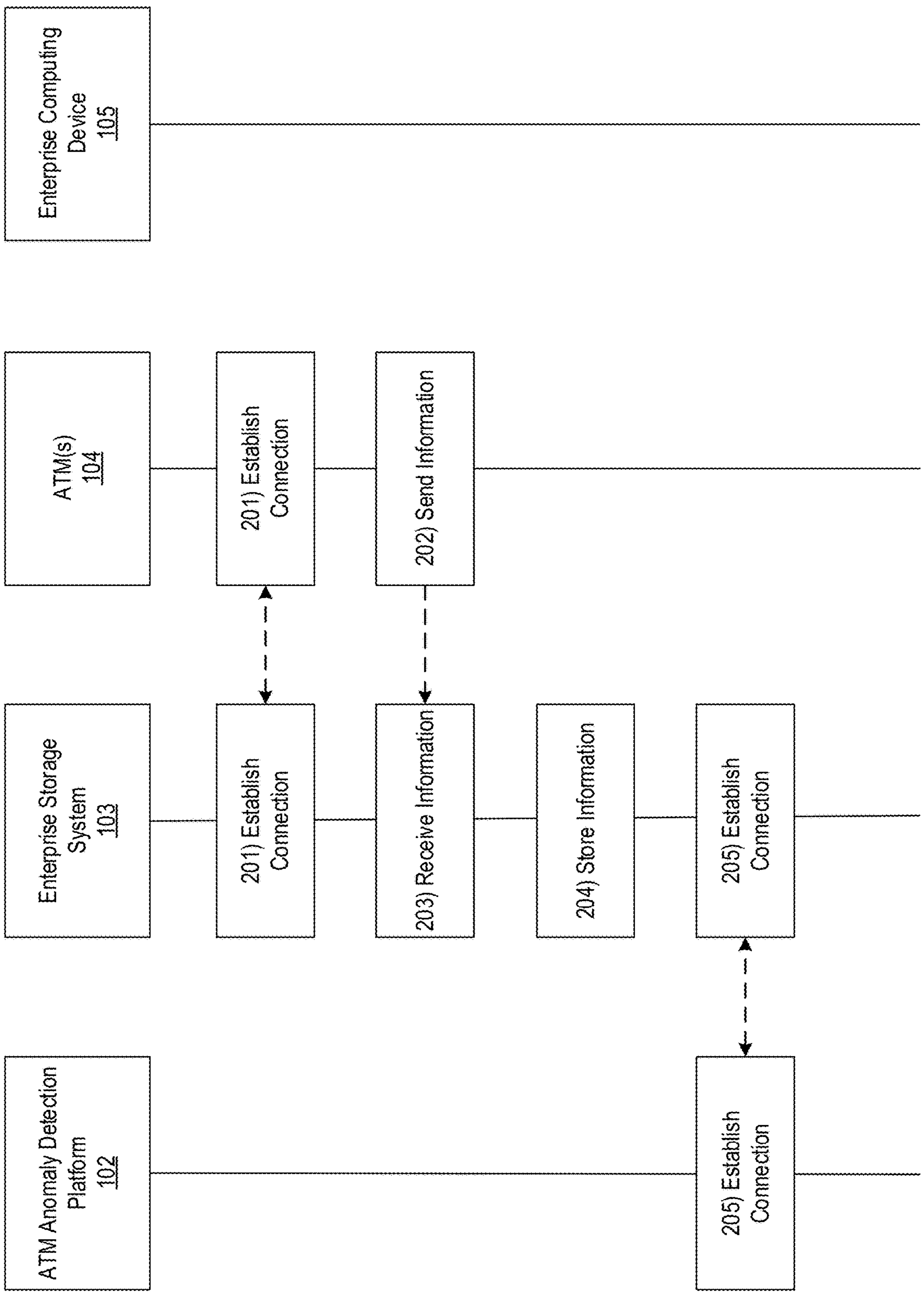
FIGS. 2A-2D depict an illustrative event sequence for detecting and resolving ATM anomalies in accordance with one or more aspects described herein.

FIGS. 2A-2D depict an illustrative event sequence for identifying and resolving ATM anomalies in accordance with one or more aspects described herein. Referring to FIG. 2A, at step 201, ATMs 104 may establish a connection with enterprise storage system 103. For example, ATMs 104 may establish a first wireless data connection with enterprise storage system 103 to link ATMs 104 to enterprise storage system 103 (e.g., in preparation for sending information that may indicate one or more anomalies). In some instances, ATMs 104 may identify whether or not a connection is already established with enterprise storage system 103. If a connection is already established with enterprise storage system 103, ATMs 104 might not re-establish the connection. If a connection is not already established with enterprise storage system 103, ATMs 104 may establish the first wireless data connection as described herein.

At step 202, ATMs 104 may send the information to enterprise storage system 103. For example, ATMs 104 may send the information to enterprise storage system 103 while the first wireless data connection is established. At step 203, enterprise storage system 103 may receive the information. For example, enterprise storage system 103 may receive the information while the first wireless data connection is established.

In some instances, the information may be related to transactions that occurred at ATMs 104, such as deposit information (e.g., cash deposited into one or more of ATMs 104). Additionally or alternatively, the information may include ATM dispense information (e.g., cash dispensed into one or more of ATMs 104). This information may be indicative of an anomaly if, for example, a mismatch exists between an amount of cash deposited at ATM and an amount of cash dispensed at an ATM.

Additionally or alternatively, enterprise storage system 103 may receive information from other sources (not shown), such as general ledger information from a general ledger information source (e.g., a comprehensive record of financial information associated with ATMs 104), which may be maintained by enterprise storage system 103. Additionally or alternatively, enterprise storage system 103 may receive vendor claim information from a vendor claim source, which may refer to claims generated by one or more ATM vendor servicers associated with a subset of ATMs 104. Vendor claim information may also include a claim identifier, a claim amount, a claim status, a claim reason, a vendor name, and/or other types of similar information.

In some instances, the information received by enterprise storage system 103 may include one or more ATM attributes, such as an ATM identifier, ATM manufacturer, ATM model, state, city, market, country, address, zip code, latitude and longitude, branch, and/or other similar information, which may be used in furtherance of detecting and resolving ATM anomalies.

At step 204, enterprise storage system may store the information. In some instances, the storing may occur anytime enterprise storage system 103 receives information from ATMs 104 or any other information source (e.g., in real-time). In some instances, the storing may occur on a periodic basis (e.g., once every 24 hours).

At step 205, enterprise storage system 103 may establish a connection with ATM anomaly detection platform 102. For example, enterprise storage system 103 may establish a second wireless data connection with ATM anomaly detection platform 102 to link enterprise storage system 103 to ATM anomaly detection platform 102 (e.g., in preparation for sending the information). In some instances, enterprise storage system 103 may identify whether or not a connection is already established with ATM anomaly detection platform 102. If a connection is already established with ATM anomaly detection platform 102, enterprise storage system 103 might not re-establish the connection. If a connection is not already established with ATM anomaly detection platform 102, enterprise storage system 103 may establish the second wireless data connection as described herein.

Figure 2B:
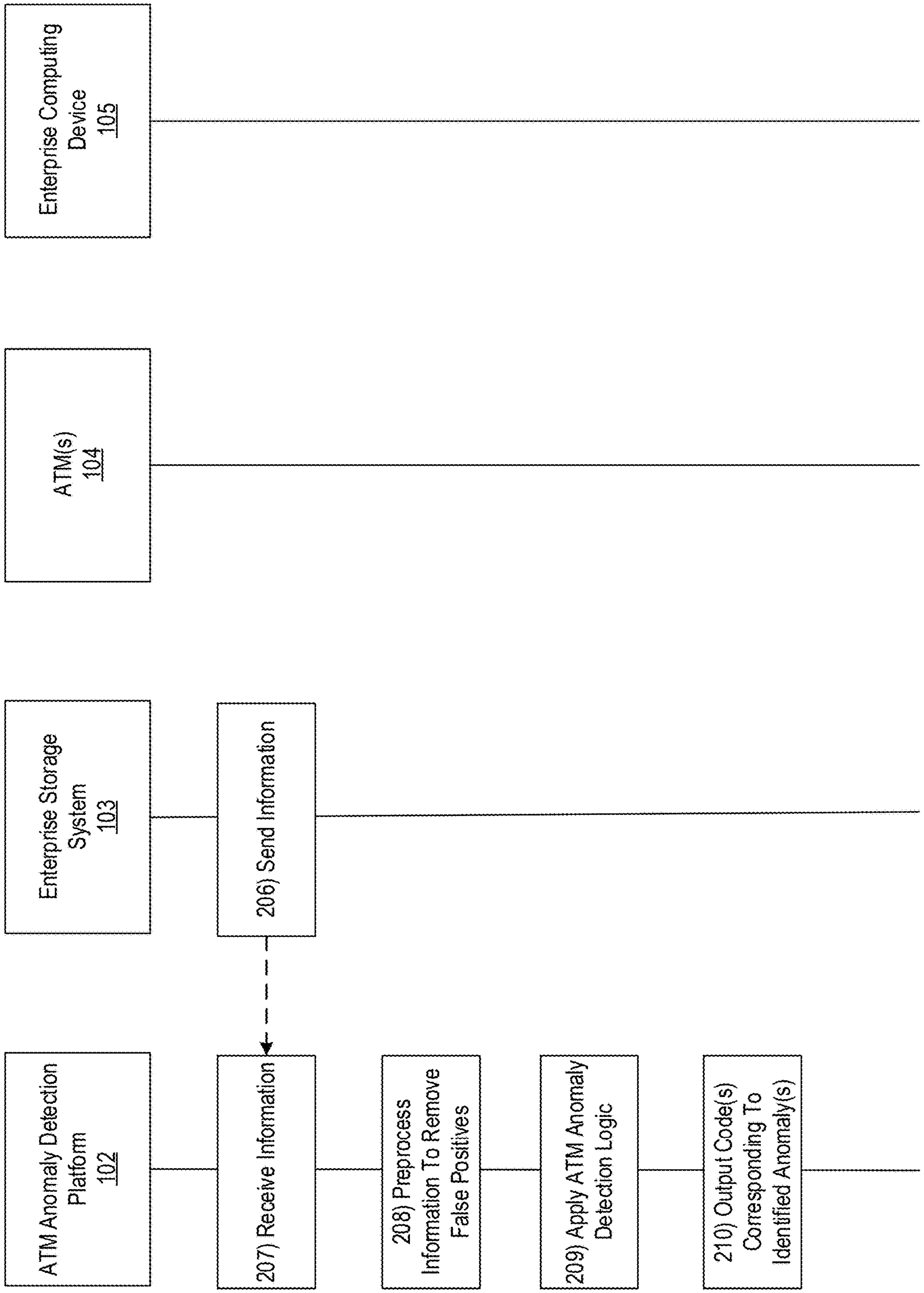

Referring to FIG. 2B, at step 206, enterprise storage system 103 may send the information to ATM anomaly detection platform 102. For example, enterprise storage system 103 may send the information via the communication interface 113 and while the second wireless data connection is established. At step 207, ATM anomaly detection platform 102 may receive the information. For example, ATM anomaly detection platform 102 may receive the information via the communication interface 113 and while the second wireless data connection is established.

At step 208, ATM anomaly detection platform 102 may preprocess the information to remove false positives. A false positive may refer to an instance in which a transaction associated with the information is not indicative of an anomaly. As such, preprocessing the information may be performed to remove information that does not indicate an anomaly (e.g., a mismatch in deposit/dispense information that has already been resolved, or the like). For example, if a transaction associated with the information is below a dollar amount threshold, then ATM anomaly detection platform may prefilter that information.

Figure 4:
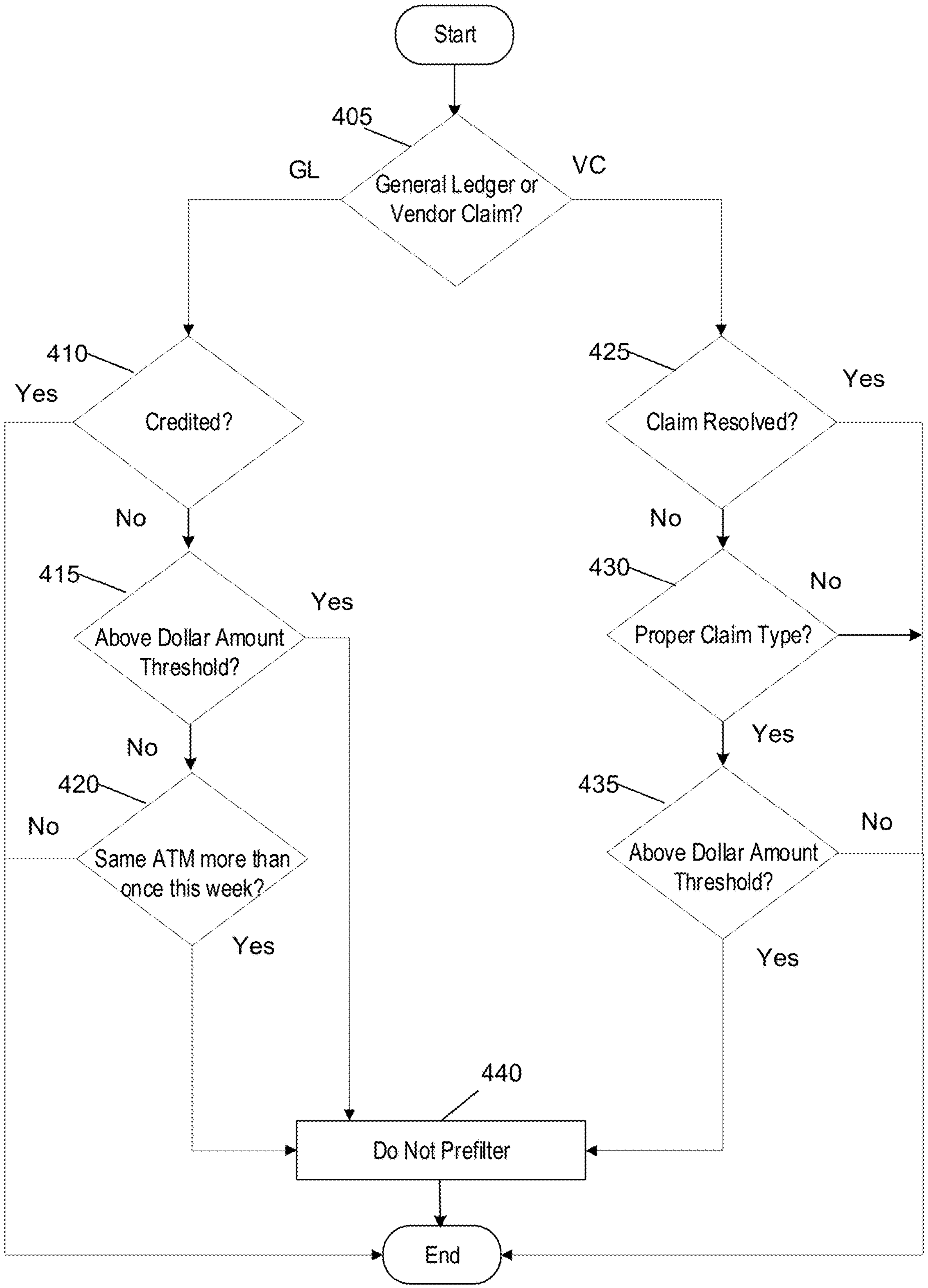

As another example, there may be a mismatch between a credit and debit settlement at an ATM. This may refer to a mismatch between the amount of money withdrawn from the ATM and the amount of money deposited into the ATM, which may be indicative of an anomaly. In some instances, the prefiltering may be customized based on the source of the information (e.g., a general ledger information source or a vendor claim information source). For example, a claim associated with a vendor claim information source may be prefiltered if the claim has already been resolved. FIG. 4 (discussed in more detail below) describes an example of how information may or may not be prefiltered to remove false positives.

The information that is not prefiltered may be subject to the actions performed in step 209. In some instances, information that is prefiltered may be stored by ATM anomaly detection platform 102 at, for example, intelligent database 112*b*.

Figure 5:
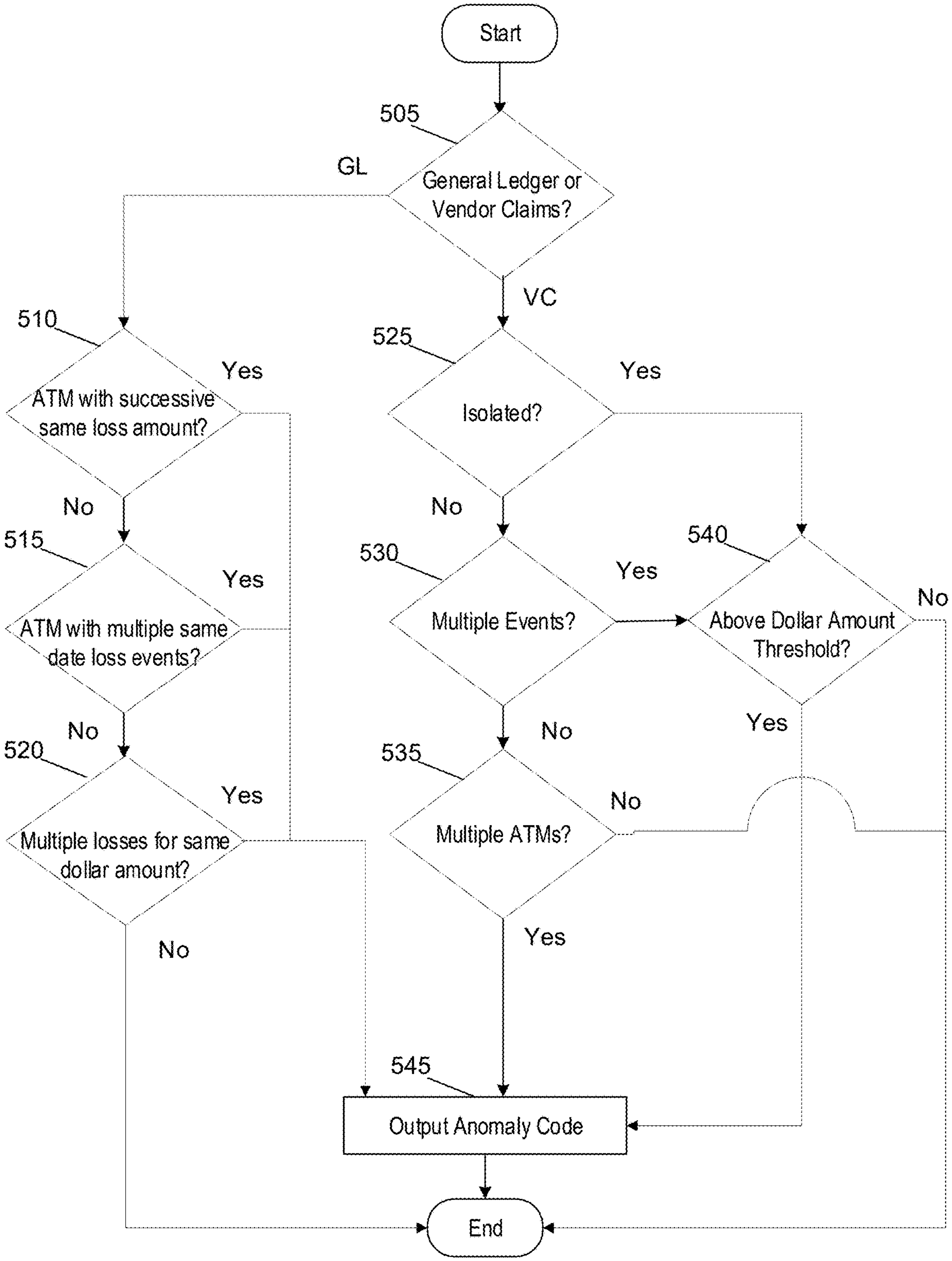

At step 209, ATM anomaly detection platform 102 may apply ATM anomaly detection logic to the preprocessed information. The ATM anomaly detection logic may refer to the application of one or more rules to the preprocessed information to determine whether the information may be an anomaly. An example rule may be whether potentially anomalous activity associated with the information occurred successively at the same ATM for the same dollar amount. Another example rule may be whether potentially anomalous activity gave rise to a loss that is greater than a dollar amount threshold. Another example rule may be whether potentially anomalous activity has occurred at more than one ATM within a geographic region. FIG. 5 (discussed in more detail below) shows an example of how ATM anomaly detection platform 102 may apply the anomaly detection logic to the information that was not prefiltered in step 208.

In some instances, the anomaly detection logic may be applied differently depending on the source of the information (e.g., whether the information originated from ATMs 104, a general ledger information source, a cash exception information source, a vendor claims information source, etc). In this manner, the anomaly detection logic may be customized based on the originating source of the information. If the information is anomalous, ATM anomaly detection platform 102 may output an anomaly code (step 210).

At step 210, ATM anomaly detection platform 102 may output one or more anomaly codes corresponding to the anomalies that were identified by ATM anomaly detection platform 102 at step 209. In some instances, an anomaly code may represent a single transaction at an ATM that has been determined by ATM anomaly detection platform 102 to be anomalous. Additionally or alternatively, an anomaly code may represent multiple transaction at an ATM that, together, have been determined by ATM anomaly detection platform 102 to be anomalous. Additionally or alternatively, an anomaly code may represent one or more transactions at one or more ATMs without departing from the scope of the disclosure. In some instances, the anomaly may include information related to one or more attributes of ATMs 104, such as an ATM identifier, ATM manufacturer, ATM model, state, city, market, country, address, zip code, latitude and longitude, branch, and/or other similar information. This information may be used in furtherance of trending and/or resolving the anomalies, as discussed in more detail at step 211.

Figure 2C:
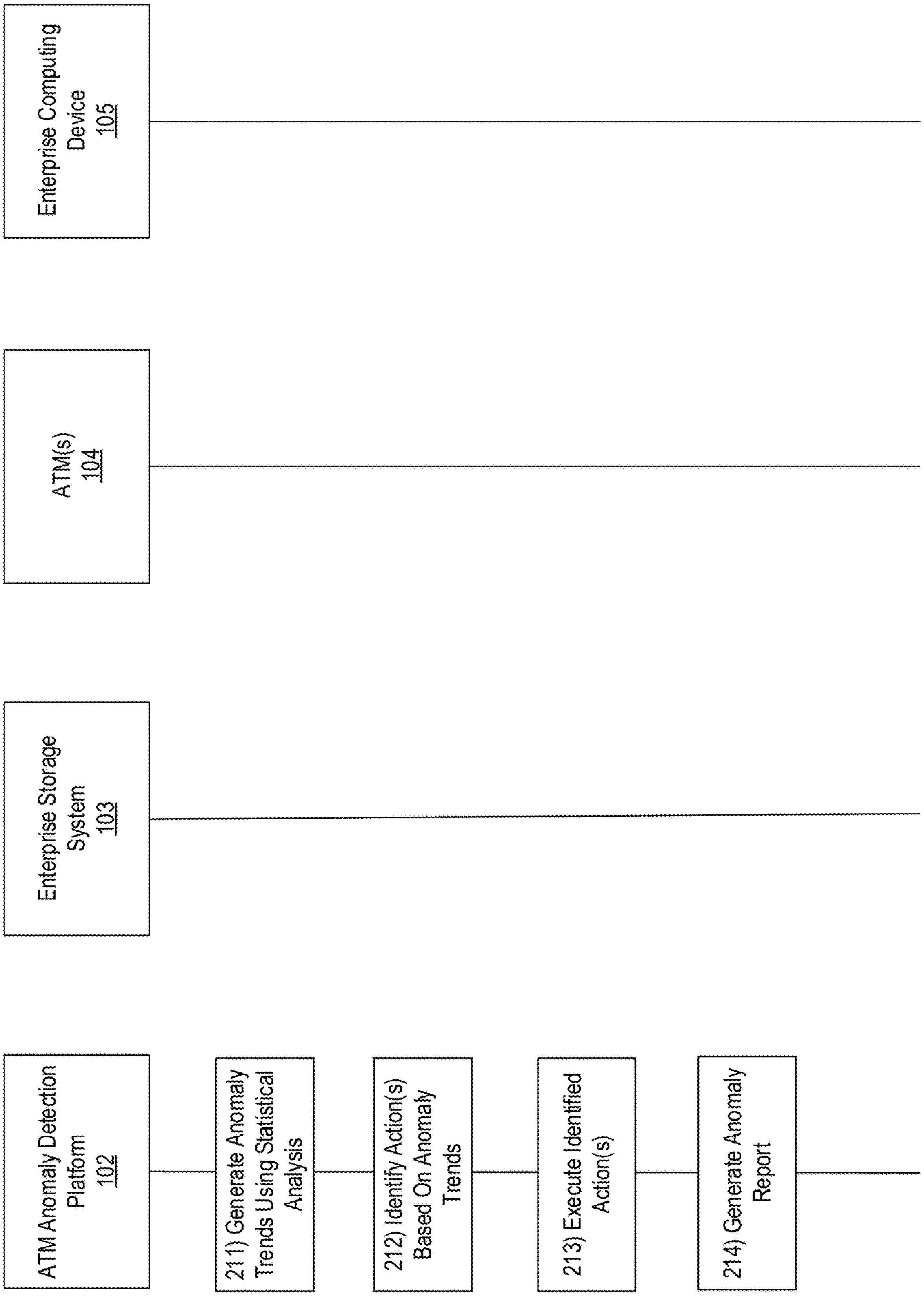

Referring to FIG. 2C, at step 211, ATM anomaly detection platform 102 may generate anomaly trends using statistical analysis. For example, ATM anomaly detection platform 102 may aggregate the anomaly codes that were outputted at step 210 in order to trend the anomalies that correspond to the anomaly codes. In some instances, the trending may be performed on a real-time basis. Additionally or alternatively, the trending may be performed periodically (e.g., once every 24 hours). In some instances, the trending may be performed based on the source of the information that corresponds to the anomaly (e.g., a general ledger information source, a vendor claim information source, or the like).

Figure 7:
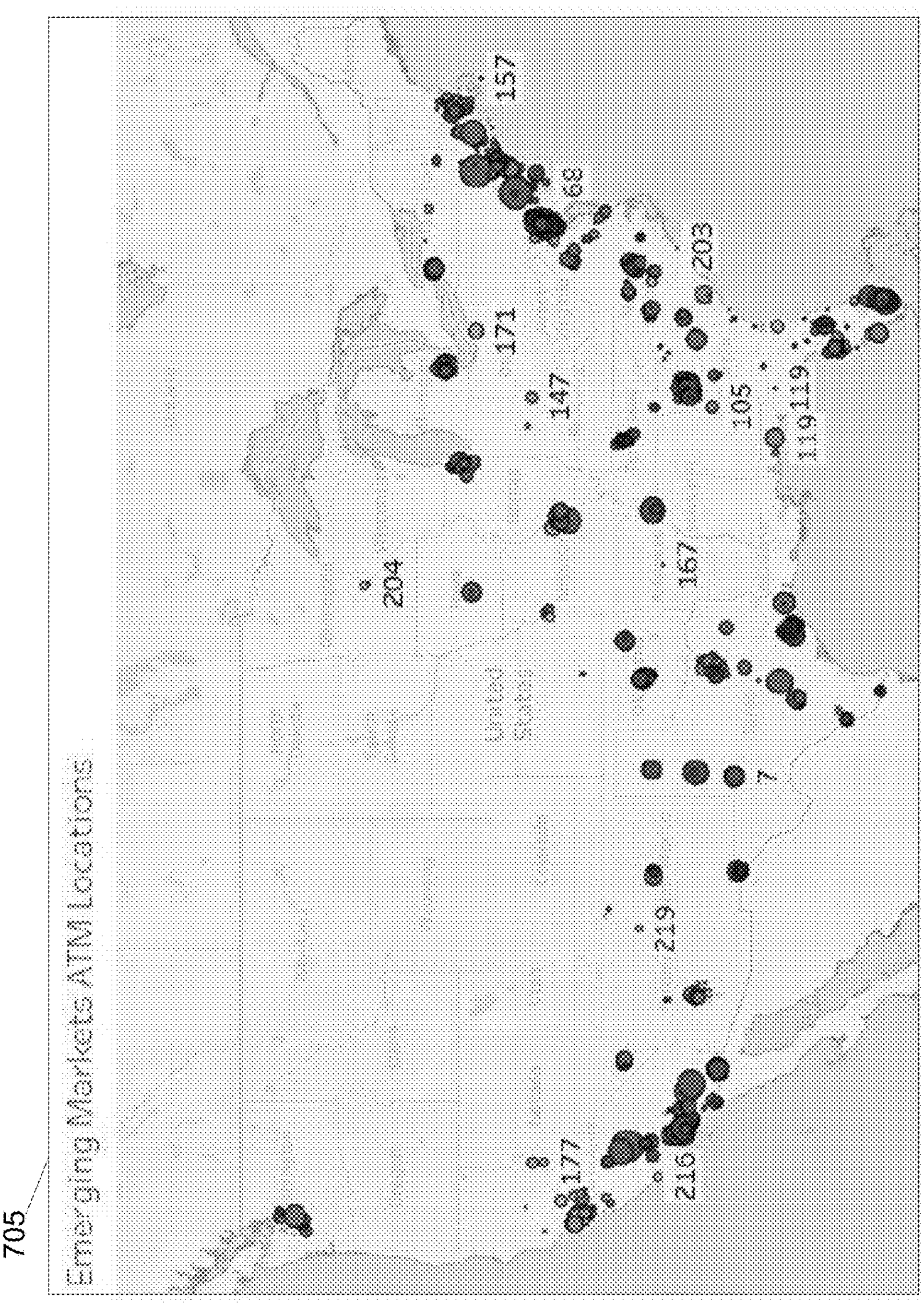
FIGS. 7-8 depict illustrative graphical user interfaces for detecting and resolving ATM input anomalies in accordance with one or more aspects described herein.

In some instances, the trending may be performed at a market level. A market may represent one or more ATMs of ATMs 104 within a certain geographical region. An example of trending at a market level is shown by FIG. 7. For example, display 705 of FIG. 7 may show a graphical user interface depicting one or more emerging market locations. The emerging market locations may be further delineated by geographic regions. The geographic regions may further be broken down into subregions of one or more ATMs. A group of ATMs with anomalous activity may be represented as a concentric circle, in which the circumference of the circle may increase based on an increase of anomalous activity at the group of ATMs. This may assist the identification of emerging trends within various geographical regions.

In some instances, the trending may be performed at an ATM level, in which anomaly codes are categorized based on the ATM in which the anomaly corresponding to the anomaly originated. Trending may be performed within a certain period of time (e.g., 1-year trends, 3 month trends, etc). In this manner, ATM anomaly detection platform 102 may identify emerging markets in which anomalous activity is occurring at a greater rate than other markets, where more than a threshold number of anomalies are being detected, or the like. As such, trending may be performed using various ways without departing from the scope of the disclosure.

At step 212, ATM anomaly detection platform 102 may identify actions based on the anomaly trends. In some instances, the actions may be identified manually by, for example, enterprise computing device 105. In some instances, the actions may be automatically identified by using, for example, anomaly resolution model 112*c*. For example, the anomaly resolution model may be a statistical model that is trained using statistical information related to the anomaly trends, which may be used to make statistical correlations related to the anomaly trends, and identify actions based on the statistical correlations.

For example, if the expected number of anomalies for a properly functioning ATM is 10 per week based on the statistical information that trained the anomaly resolution model, and an ATM receives 25 anomalies in a week week, representing, for example, more than one standard deviation greater than the expected number of anomalies, then that deviation trigger ATM anomaly detection platform 102 to identify and/or automatically execute an action to resolve the anomalies that occurred at the ATM.

Figure 6:
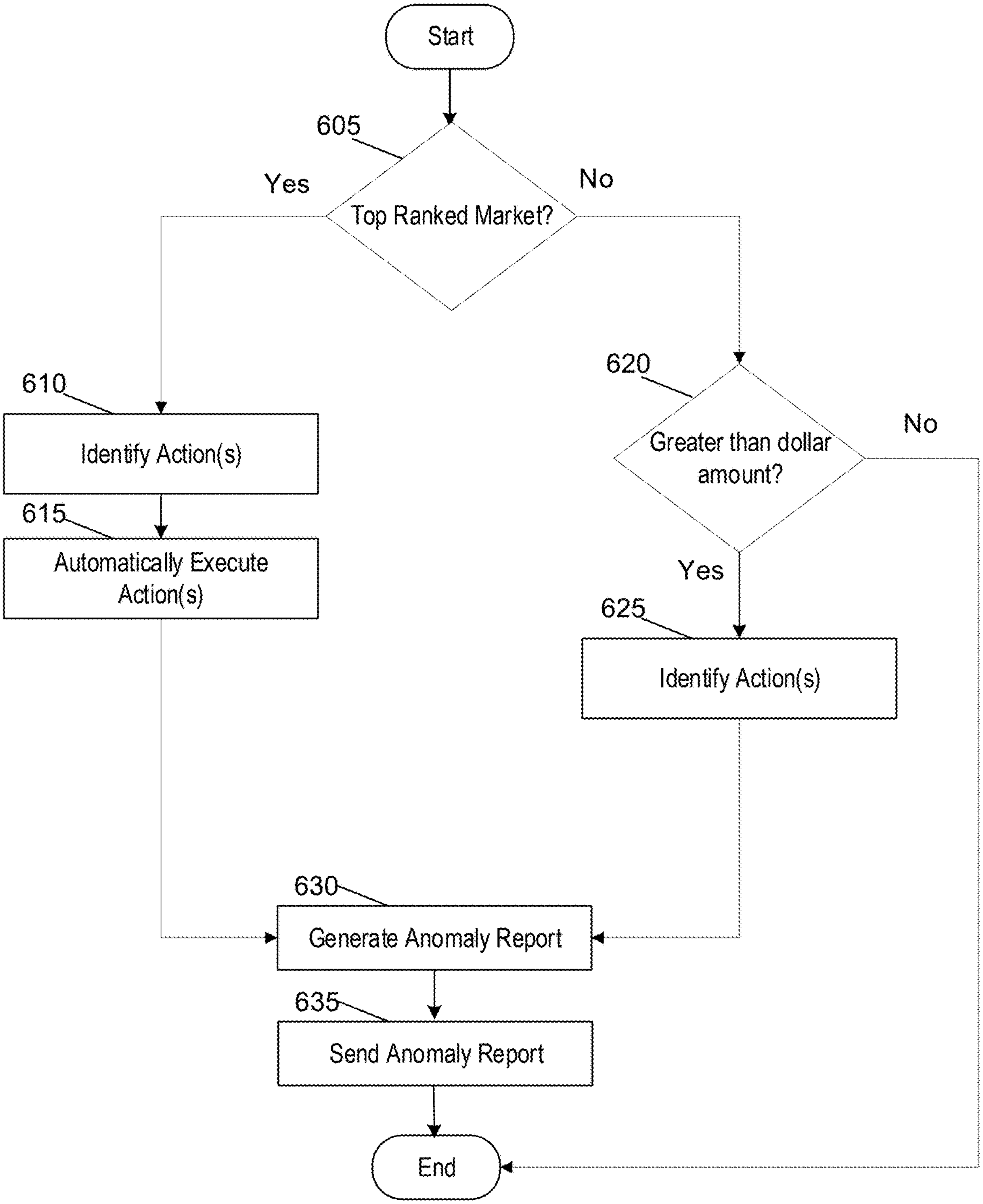

In some instances, rather than using a trained statistical model, actions may be identified based on a highest market rank compared to other markets (e.g., what is described by FIG. 6). Additionally or alternatively, the actions may be identified based on a rate of change of anomalies, to identify an emerging market to take action on. In some instances, actions may be determined based on a dollar amount threshold.

An example action may be notifying a branch corresponding to a top ranked market. Another example action may be shutting down (by e.g., sending automated shut off instructions to an ATM) and/or servicing one or more ATMs within a top ranked market. Another example action may be applying a software update to one or more ATMs. Another example action may be generating an anomaly report and sending the report to a team that may further investigate the anomalies. In some instances, actions may be based on the information source that gave rise to the detected anomalies. For example, anomalies that originated from a vendor claims information source may lead to an action of notifying a vendor associated with the one or more ATMs in which the anomalies originated.

At step 213, ATM anomaly detection platform 102 may execute the identified actions. For example, if an action is specific to an ATM, then ATM anomaly detection platform may generate and send commands, that when received by the ATM, direct the ATM to automatically execute the action. If the action is generating and sending a report (e.g., step 214) to the proper team for further review/analysis, then ATM anomaly detection platform 102 may automatically execute that action.

Figure 8:
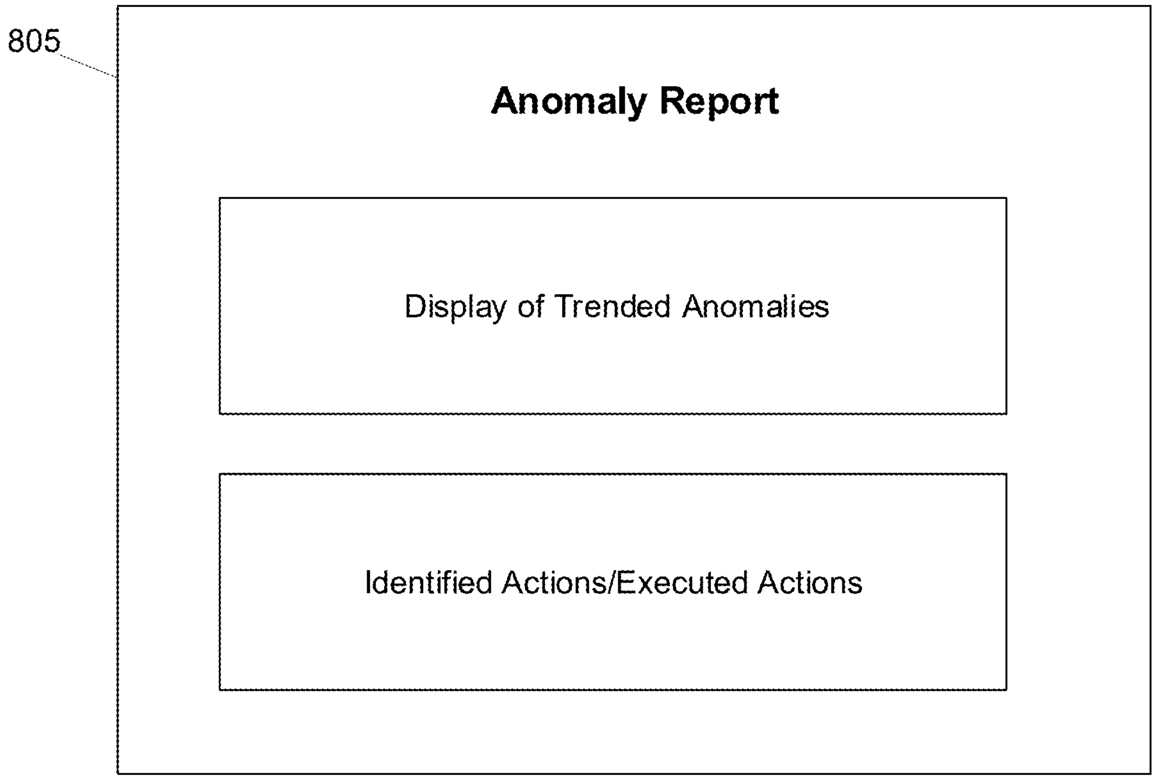

At step 214, ATM anomaly detection platform may generate an anomaly report. The report may include information such as a display of the trending that was performed at step 211, the actions that were identified at step 213, and (if applicable), that the actions were automatically executed at one or more ATMs of ATMs 104. In some instances, the anomaly report may look like what is shown in FIG. 8. For example, display 805 of FIG. 8 may show a display of the anomaly trends that were generated in step 211. In some instances, the display of anomaly trends may be similar to (but not limited to) the emerging market trends shown in FIG. 7. Display 805 may also display the actions that were identified in step 212, and a notification that the actions were executed.

Figure 2D:
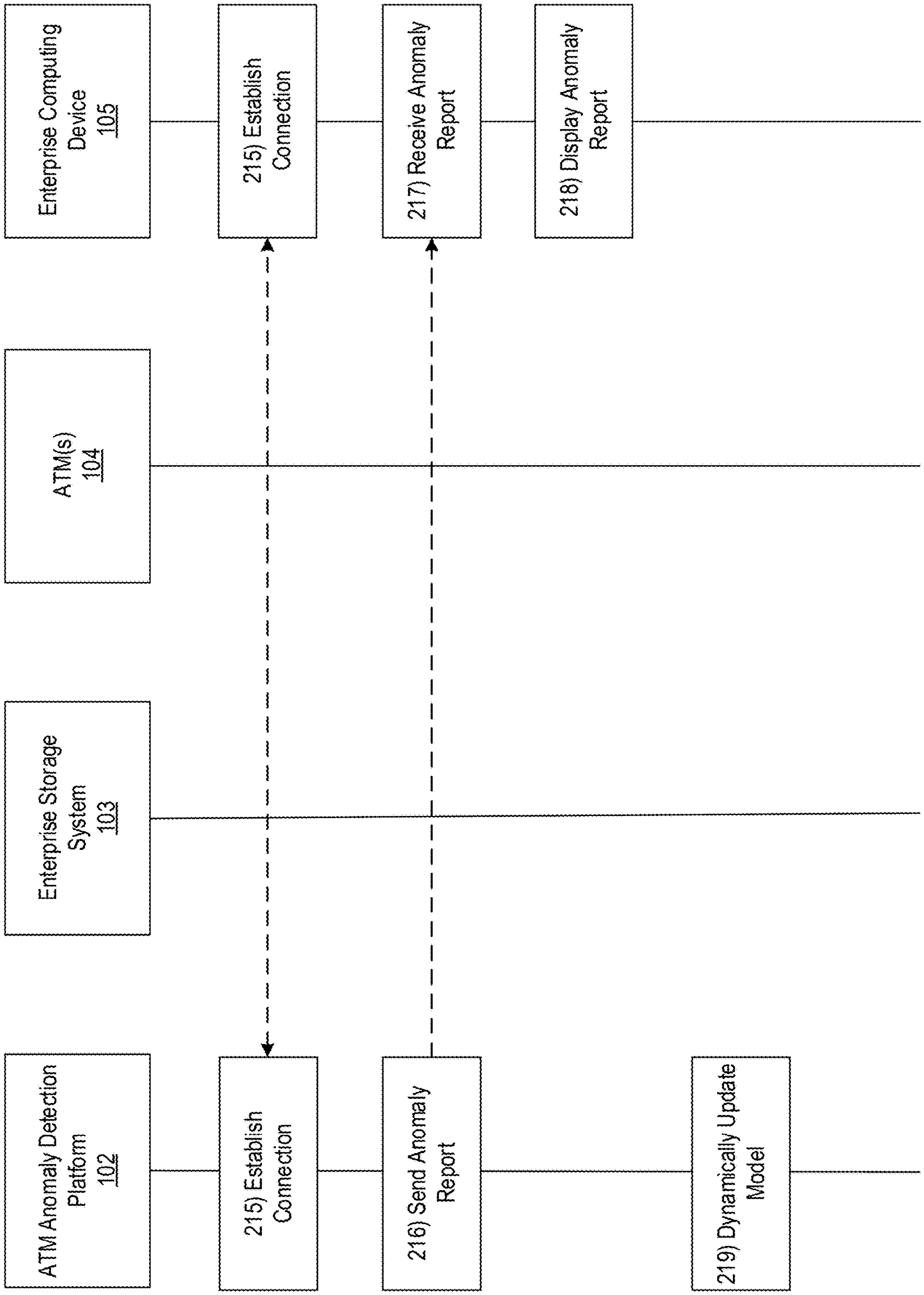

Referring to FIG. 2D, at step 215, ATM anomaly detection platform 102 may establish a connection with enterprise computing device 105. For example, ATM anomaly detection platform 102 may establish a third wireless data connection with enterprise storage system 103 to link ATM anomaly detection platform 102 to enterprise storage system 103 (e.g., in preparation for sending the anomaly report) In some instances, ATM anomaly detection platform 102 may identify whether or not a connection is already established with enterprise storage system 103. If a connection is already established with enterprise storage system 103, ATM anomaly detection platform 102 might not re-establish the connection. If a connection is not already established with enterprise storage system 103, ATM anomaly detection platform 102 may establish the third wireless data connection as described herein.

At step 216, ATM anomaly detection platform 102 may send the anomaly report to enterprise computing device 105. For example, ATM anomaly detection platform 102 send the anomaly report via the communication interface 113 and while the third wireless data connection is established. In some instances, ATM anomaly detection platform 102 may also send commands directing enterprise computing device 105 to display the anomaly report.

At step 217, enterprise computing device 105 may receive the report and the commands directing enterprise computing device 105 to display the anomaly report. For example, enterprise computing device may receive the anomaly report and the commands via the communication interface 113 and while the third wireless data connection is established. At step 218, enterprise computing device 105 may display the anomaly report. The report may look like what is shown in FIG. 8.

At step 219, ATM anomaly detection platform 102 may dynamically update the anomaly resolution model. For example, ATM exception identification and analysis platform 102 may dynamically update the model (by creating, e.g., a dynamic feedback loop) based on the outputs of step 208-213, and/or feedback from enterprise storage system 103, ATMs 104, and/or enterprise computing device 105. In doing so, ATM anomaly detection platform 102 may dynamically and continuously update and/or otherwise refine the model so as to increase accuracy of the model over time. In increasing the accuracy of the model, the model may increase the effectiveness of detecting and resolve ATM anomalies. In some instances, ATM anomaly detection platform 102 may also dynamically update how the information was preprocessed in step 208. Additionally or alternatively, ATM anomaly detection platform 102 may dynamically update the ATM anomaly detection logic.

Figure 3:
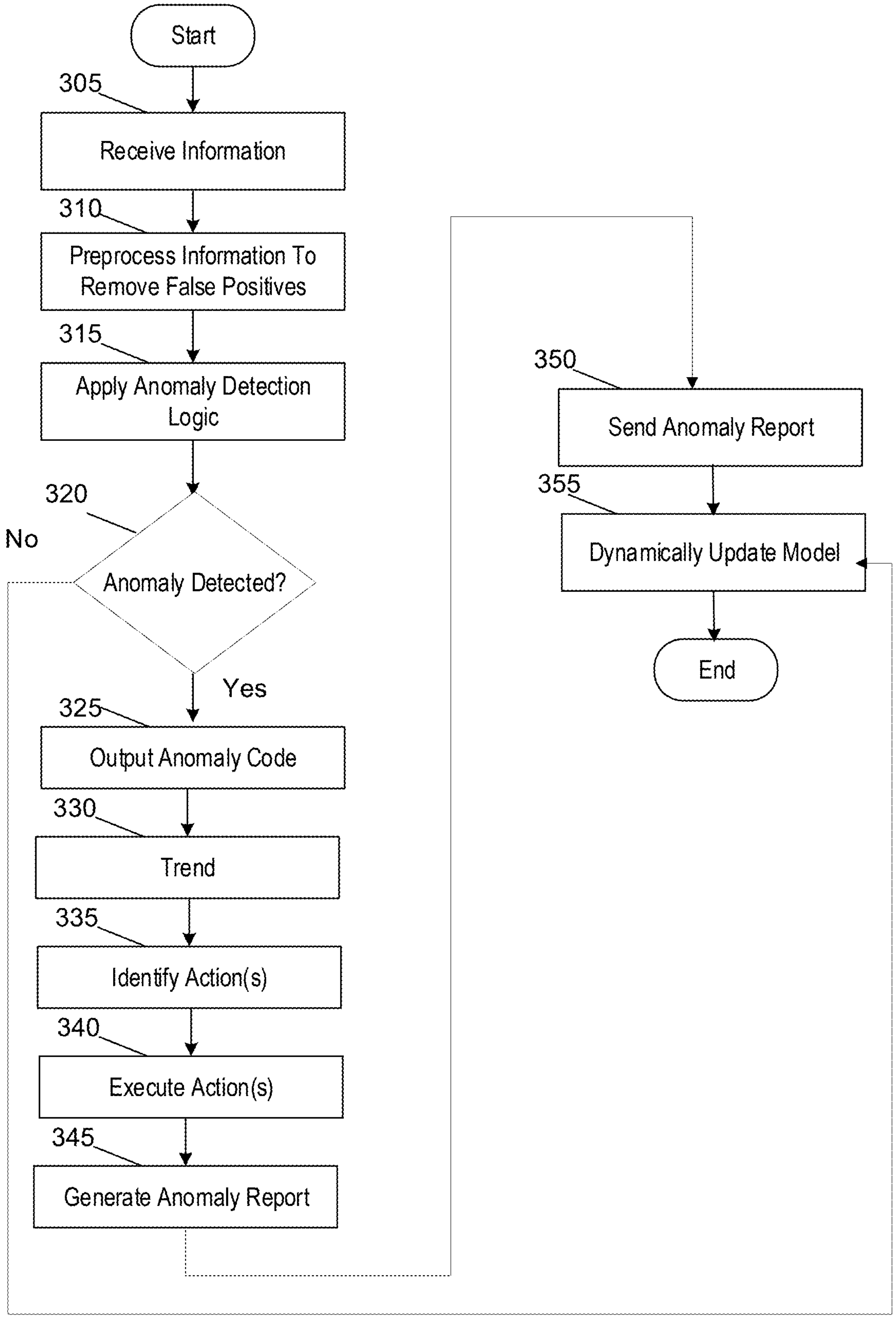
FIGS. 3-6 depict illustrative methods for detecting and resolving ATM anomalies in accordance with one or more aspects described herein.

FIG. 3 depicts an illustrative method for detecting and resolving anomalies in accordance with one or more aspects described herein. At step 305, a computing platform having at least one processor, a communication interface, and memory may receive information that may indicate the presence of an anomaly at an ATM (e.g., one or more of ATMs 104). At step 310, the computing platform may preprocess the information to remove false positives.

At step 315, the computing platform may apply anomaly detection logic to the information that was not prefiltered. At step 320, the computing platform may determine whether an anomaly has been detected. If an anomaly has been detected, then the computing platform may proceed to step 325. If an anomaly has not been detected, then the computing platform may proceed to step 355.

At step 325, the computing platform may output an anomaly code based on the detected anomaly. At step 330, the computing platform may trend the anomalies using statistical analysis. At step 335, the computing platform may identify actions based on the anomaly trends and/or using an anomaly resolution model. At step 340, the computing platform may execute the actions to resolve the anomalies.

At step 345, the computing platform may generate an anomaly report. At step 350, the computing platform may send the anomaly report. At step 355, the computing platform may dynamically update the anomaly detection model.

FIG. 4 depicts an illustrative method for detecting and resolving anomalies in accordance with one or more aspects described herein. At step 405, a computing platform having at least one processor, a communication interface, and memory may determine whether a source of the information is a general ledger information source or a vendor claim source. If the information source is a general ledger information source, then the computing platform may proceed to step 410. If the information source is a vendor claim source, then the computing platform may proceed to step 425.

At step 410, the computing platform may determine whether a transaction associated with the information has been credited. If the transaction has not been credited, the computing platform may proceed to step 415. If the transaction has been credited, the computing platform may prefilter the information.

At step 415, the computing platform may determine whether a dollar amount associated with the information is above a dollar amount threshold. If the dollar amount associated with the information is not above a dollar amount threshold, then the computing platform may proceed to step 420. If the dollar amount associated with the information is equal to or above the dollar amount threshold, then the computing platform may proceed to step 440.

At step 420, the computing platform may determine whether a potentially anomalous transaction occurred at the same ATM more than once in a week. If the potentially anomalous transaction occurred at the same ATM more than once in a week, then the computing platform may proceed to step 440. If the potentially anomalous transaction did not occur at the same ATM more than once in a week, the computing platform may prefilter the information.

At step 425, the computing platform may determine whether the claim has been resolved. If the claim has not been resolved, the computing platform may proceed to step 430. If the claim has been resolved, the computing platform may prefilter the information.

At step 430, the computing platform may determine whether the claim type is proper. If the claim type is proper, the computing platform may proceed to step 435. If the claim type is not proper, the computing platform may prefilter the claim.

At step 435, the computing platform may determine whether a dollar amount of the claim is above a dollar amount threshold. If the dollar amount of the claim is above a dollar amount threshold, then the computing platform may proceed to step 440. If the dollar amount of the claim is not above a dollar amount threshold, then the computing platform may prefilter the claim.

At step 440, the computing platform may not prefilter the information and subsequently apply ATM anomaly detection logic to the prefiltered information (e.g., what is shown in FIG. 5).

FIG. 5 depicts an illustrative method for detecting and resolving anomalies in accordance with one or more aspects described herein. At step 505, a computing platform having at least one processor, a communication interface, and memory may determine whether a source of the information is a general ledger information source or a vendor claim source. If the information source is a general ledger information source, then the computing platform may proceed to step 510. If the information source is a vendor claim source, then the computing platform may proceed to step 525.

At step 510, the computing platform may determine whether a transaction associated with the information has occurred successively at an ATM with the same loss amount. If the transaction associated with the information has not occurred successively at an ATM with the same loss amount, then the computing platform may proceed to step 515. If the transaction associated with the information has occurred successively at an ATM with the same loss amount, then the computing platform may proceed to step 545.

At step 515, the computing platform may determine whether the information includes an ATM with multiple same date loss events. If the information does not include an ATM with multiple same date loss events, the computing platform may proceed to step 520. If the information does include an ATM with multiple same date loss events, the computing platform may proceed to step 525.

At step 520, the computing platform may determine whether the information includes multiple losses for same dollar amount. If the information does not include multiple losses for same dollar amount, the computing platform may not output an anomaly code for that information. If the information does include multiple losses for same dollar amount, the computing platform may proceed to step 545.

At step 525, the computing platform may determine whether the claim is isolated. If the claim is not isolated, the computing platform may proceed to step 530. If the claim is isolated, the computing platform may proceed to step 540.

At step 530, the computing platform may determine whether the claim includes multiple events. If the claim does not include multiple events, the computing platform may proceed to step 535. If the claim does include multiple events, the computing platform may proceed to step 545.

At step 535, the computing platform may determine whether the claim includes multiple ATMs. If the claim includes multiple ATMs, the computing platform may proceed to step 545. If the claim does not include multiple ATMs, the computing platform may not output an anomaly code corresponding to the claim.

At step 540, the computing platform may determine whether a dollar amount associated with the claim is above dollar amount threshold. If the dollar amount associated with the claim is above dollar amount threshold, the computing platform may proceed to step 545. If the dollar amount associated with the claim is not above dollar amount threshold, the computing platform may end the method (or in some instances, dynamically update the ATM anomaly detection logic).

At step 545, the computing platform may output an anomaly code.

FIG. 6 depicts an illustrative method for detecting and resolving anomalies in accordance with one or more aspects described herein. At step 605, a computing platform having at least one processor, a communication interface, and memory may determine whether trended anomalies correspond to a top ranked market. If the trended anomalies correspond to a top ranked market, the computing platform may proceed to step 610. If the trended anomalies do not correspond to a top ranked market, the computing platform may proceed to step 620.

At step 610, the computing platform may identify one or more actions to resolve the trended anomalies for ATMs within the market. At step 615, the computing platform may execute actions.

At step 620, the computing platform may determine whether a dollar amount of the trended anomalies for the ATMs within the market are greater than a dollar amount. If the dollar amount of the trended anomalies for the ATMs within the market are greater than dollar amount, then the computing platform may proceed to step 625. If the dollar amount of the trended anomalies for the ATMs within the market are less than dollar amount, then the computing platform may not take any action.

At step 630, the computing platform may generate an anomaly report. At step 635, the computing platform may send the anomaly report (similar to what is shown in FIG. 3).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

apply anomaly detection logic to information indicating potentially anomalous activity at one or more automated teller machines (ATMs), wherein the anomaly detection logic includes one or more rules that are used to identify one or more anomalies;

output, based on applying the anomaly detection logic, one or more anomaly codes, wherein the one or more anomaly codes correspond to the one or more anomalies;

trend the one or more anomalies based on the one or more anomaly codes and using statistical analysis;

identify one or more actions to resolve the one or more anomalies based on the trending;

automatically execute the one or more actions by sending commands to the one or more ATMs affected by the one or more anomalies, that when received by the one or more ATMs affected by the one or more anomalies, direct the one or more ATMs affected by the one or more anomalies to execute the one or more actions;

generate an anomaly report, wherein the anomaly report comprises the one or more anomalies, the trending, and the one or more actions; and send, to an enterprise computing device, the anomaly report and one or more commands directing the enterprise computing device to display the anomaly report, wherein sending the one or more commands directing the enterprise computing device to display the anomaly report causes the enterprise computing device to display the anomaly report.

2. The computing platform of claim 1, wherein the memory stores additional computer-readable instructions that, when executed by the at least one processor, cause the computing platform to:

preprocess, before applying the anomaly detection logic, the information to remove one or more false positives from the information.

3. The computing platform of claim 1, wherein the memory stores additional computer-readable instructions that, when executed by the at least one processor, cause the computing platform to:

train, based on statistical anomaly information, an anomaly resolution model, wherein training the anomaly resolution model configures the anomaly resolution model to identify, based on the statistical anomaly information, the one or more actions to resolve the one or more anomalies, wherein identifying the one or more actions to resolve the one or more anomalies is further performed using the anomaly resolution model.

4. The computing platform of claim 3, wherein the memory stores additional computer-readable instructions that, when executed by the at least one processor, cause the computing platform to:

update, using a dynamic feedback loop and based on the statistical anomaly information and the one or more actions to resolve the one or more anomalies, the anomaly resolution model.

5. The computing platform of claim 1, wherein outputting the one or more anomaly codes includes outputting one or more ATM attributes.

6. The computing platform of claim 5, wherein outputting the one or more ATM attributes comprises outputting one or more of:

an ATM identifier, an ATM manufacturer, an ATM model, a state, a city, a market, a country, an address, a zip code, a latitude and longitude, or an ATM branch.

7. The computing platform of claim 1, wherein performing the trending further comprises outputting a market rank for one or more subsets of ATMs within one or more markets.

8. The computing platform of claim 7, wherein the market rank is used to identify the one or more actions to resolve the one or more anomalies.

9. The computing platform of claim 1, wherein performing the trending further comprises generating an ATM rank for the one or more ATMs.

10. The computing platform of claim 9, wherein the ATM rank is used to identify the one or more actions to resolve the one or more anomalies.

11. The computing platform of claim 1, wherein the information originates from:

a general ledger information source; or a vendor claim source.

12. A method comprising:

at a computing platform comprising at least one processor, a communication interface, and memory:

applying anomaly detection logic to information indicating potentially anomalous activity at one or more automated teller machines (ATMs), wherein the anomaly detection logic includes one or more rules that are used to identify one or more anomalies;

outputting, based on applying the anomaly detection logic, one or more anomaly codes, wherein the one or more anomaly codes correspond to the one or more anomalies;

trending the one or more anomalies based on the one or more anomaly codes and using statistical analysis;

identifying one or more actions to resolve the one or more anomalies based on the trending;

automatically executing the one or more actions by sending commands to the one or more ATMs affected by the one or more anomalies, that when received by the one or more ATMs affected by the one or more anomalies, direct the one or more ATMs affected by the one or more anomalies to execute the one or more actions;

generating an anomaly report, wherein the anomaly report comprises the one or more anomalies, the trending, and the one or more actions; and sending, to an enterprise computing device, the anomaly report and one or more commands directing the enterprise computing device to display the anomaly report, wherein sending the one or more commands directing the enterprise computing device to display the anomaly report causes the enterprise computing device to display the anomaly report.

13. The method of claim 12, further comprising:

preprocessing, before applying the anomaly detection logic, the information to remove one or more false positives from the information.

14. The method of claim 12, further comprising:

training, based on statistical anomaly information, an anomaly resolution model, wherein training the anomaly resolution model configures the anomaly resolution model to identify, based on the statistical anomaly information, the one or more actions to resolve the one or more anomalies, wherein identifying the one or more actions to resolve the one or more anomalies is further performed using the anomaly resolution model.

15. The method of claim 14, further comprising:

updating, using a dynamic feedback loop and based on the statistical anomaly information and the one or more actions to resolve the one or more anomalies, the anomaly resolution model.

16. The method of claim 12, wherein outputting the one or more anomaly codes includes outputting one or more ATM attributes.

17. The method of claim 16, wherein outputting the one or more ATM attributes comprises outputting one or more of:

an ATM identifier, an ATM manufacturer, an ATM model, a state, a city, a market, a country, an address, a zip code, a latitude and longitude, or an ATM branch.

18. The method of claim 12, wherein performing the trending further comprises outputting a market rank for one or more subsets of ATMs within one or more markets, wherein the market rank is used to identify the one or more actions to resolve the one or more anomalies.

19. The method of claim 12, wherein the information originates from:

a general ledger information source; or a vendor claim source.

20. One or more non-transitory computer-readable media storing instructions that, when executed by a computing platform comprising at least one processor, a communication interface, and memory, cause the computing platform to:

apply anomaly detection logic to information indicating potentially anomalous activity at one or more automated teller machines (ATMs), wherein the anomaly detection logic includes one or more rules that are used to identify one or more anomalies;

output, based on applying the anomaly detection logic, one or more anomaly codes, wherein the one or more anomaly codes correspond to the one or more anomalies;

trend the one or more anomalies based on the one or more anomaly codes and using statistical analysis;

identify one or more actions to resolve the one or more anomalies based on the trending;

automatically execute the one or more actions by sending commands to the one or more ATMs affected by the one or more anomalies, that when received by the one or more ATMs affected by the one or more anomalies, direct the one or more ATMs affected by the one or more anomalies to execute the one or more actions;

generate an anomaly report, wherein the anomaly report comprises the one or more anomalies, the trending, and the one or more actions; and send, to an enterprise computing device, the anomaly report and one or more commands directing the enterprise computing device to display the anomaly report, wherein sending the one or more commands directing the enterprise computing device to display the anomaly report causes the enterprise computing device to display the anomaly report.

* * * * *